March 20, 1956 — G. H. MOREY — 2,739,221
METHOD AND APPARATUS FOR HEATING VESSELS
Filed Dec. 2, 1954
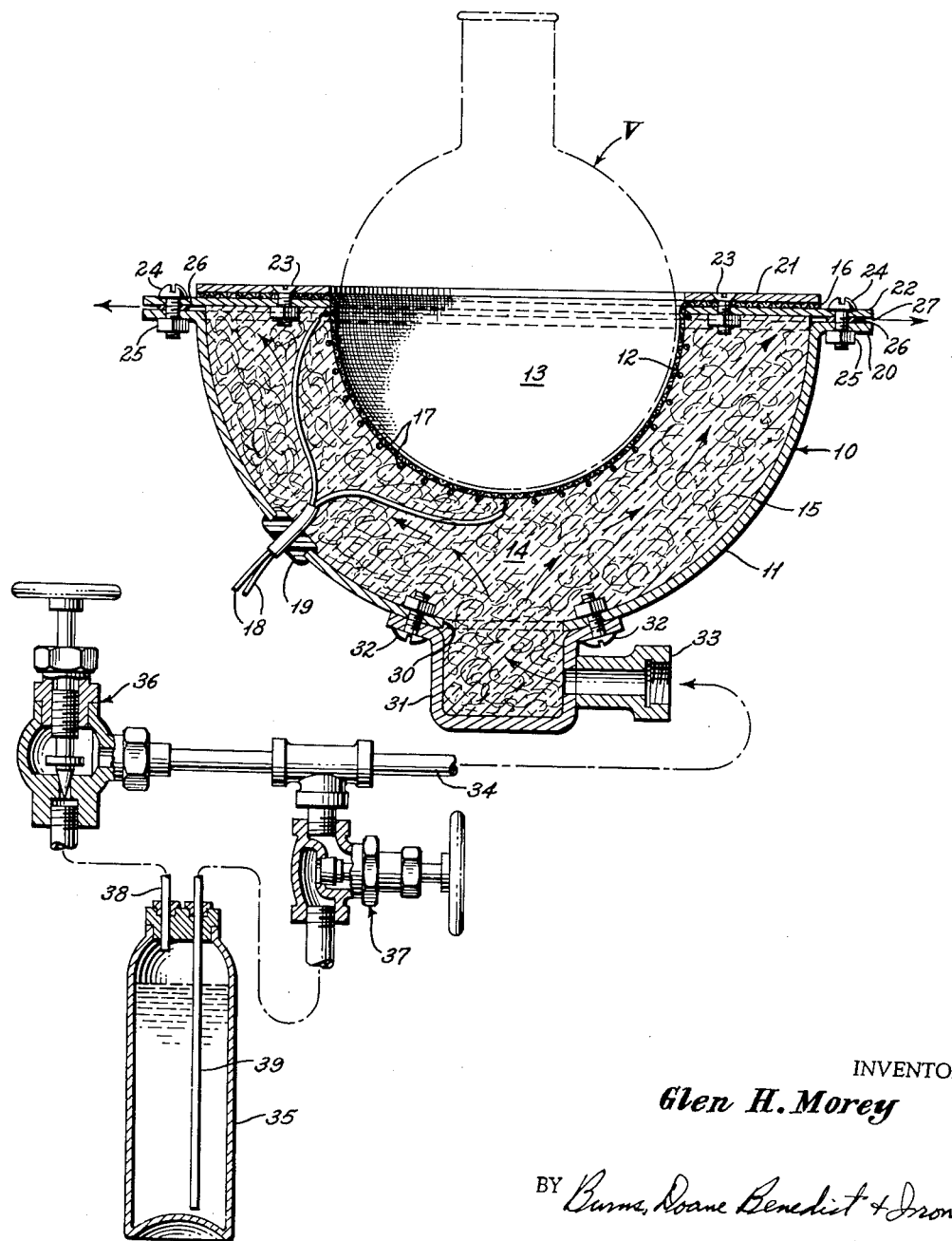
INVENTOR
Glen H. Morey
BY Burns, Doane, Benedict & Irons
ATTORNEYS

United States Patent Office 2,739,221
Patented Mar. 20, 1956

2,739,221

METHOD AND APPARATUS FOR HEATING VESSELS

Glen H. Morey, Terre Haute, Ind., assignor to Linton-Summit Coal Company, Inc., Terre Haute, Ind., a corporation of Indiana Application December 2, 1954, Serial No. 472,575

9 Claims. (Cl. 219—38)

This invention relates generally to an electric vessel heater and an improved method for regulating the heating of glass or other fragile vessels. More specifically, the invention is directed to a method and apparatus for electrical heating of vessels wherein explosion or ignition of any combustible matter is precluded and rapid cooling for regulating the heating rate of the contents of the vessel may be effected.

Although not specifically limited thereto, the instant invention is particularly well suited to heating problems performed in connection with various laboratory experiments, such as the heating of flasks in connection with such laboratory experiments. Particularly, in laboratory work, there has been a problem for many years of how to effectively and rapidly cool a flask when required in connection with a particular experiment. For example, some chemical reactions are exothermic and tend to get out of control during a heating process. When such a situation develops, or immediately prior thereto, it may be necessary to quickly cool the flask to retain control of the chemical reaction which is taking place.

When the heating is being performed in smaller flasks of five liters or less the problem can be solved by quickly removing the heating means from the flask and rapidly cooling the flask with water. This is possible since these smaller flasks can be easily supported by a clamp engaged with the neck of the flask. However, with larger sized flasks the use of a neck clamp for support of such flasks is impractical and accordingly the heating device must function as the support for the flask. Under this situation obviously the heating device cannot be removed and water applied directly to the flask. In electrical vessel heaters particularly designed for the supporting and heating of flasks it is not feasible to inject water into the heating device to effect rapid cooling of the flask supported thereon since this would very likely damage the heating elements of the device. Another objection to the use of water as a cooling medium to effect rapid cooling of a flask is that, after the use of water to retard the heating rate or to cool the flask, a relatively long period of time is required to bring the contents of the vessel back up to the desired reaction temperature.

Another problem encountered in connection with laboratory experiments is the possibility of a fire or explosion taking place due to inflammable mixtures coming in contact with the heating means. Such a fire or explosion might be caused by the reaction products given off during the performance of the experiment or other inflammable products from the surrounding area which may come in contact with the heating means, or might take place due to sudden breaking of the vessel being heated so as to discharge the vessel contents onto the heating means.

With the above problems in mind, the instant invention has been developed to particularly answer the need for a method and apparatus to enable more effective control of heating in connection with laboratory experiments. However, it will be readily recognized that the method and structure of an apparatus for carrying out such method, as described in detail hereinafter, may be readily adapted to various other fields of endeavor aside from their specific use in connection with laboratory experiments.

As exemplary of a type of heating device hereinbefore used in connection with the heating of glass flasks in laboratory experiments, attention is called to my prior Patents 2,231,506 and 2,282,078. These patents disclose flask heaters which encase all or a portion of the flask to most effectively transmit to the contents of the flask the heat given off from the heating element of the device. It will be recognized as the description progresses that the instant invention constitutes an improvement over the structures as disclosed and claimed in these prior patents.

It is a primary object of the instant invention to provide a method for heating vessels wherein the heating means is blanketed with a non-inflammable gaseous fluid to preclude explosion or combustion of any combustible matter adjacent such heating means.

It is also a primary object of the instant invention to provide a vessel heater constructed to enable blanketing of the heating element with a gaseous fluid to preclude explosion or combustion of any combustible matter adjacent the element.

It is a further object of the instant invention to provide a method for heating vessels wherein most effective regulation of the heating rate may be produced, with rapid cooling for retarding the rate of reaction of the material being heated where necessary.

It is another object of the instant invention to provide a vessel heater constructed with a heating element enclosed in a chamber whereby a cooling fluid can be passed over the heating element to effect rapid cooling of the heater in controlling the heating of the vessel contents.

It is an additional object of this invention to provide a vessel heater having a pair of spaced members with the inner member forming a pocket to receive a spherical flask during heating, a heating element positioned in the space between said members, and inlet and outlet means for said space to permit a gaseous cooling fluid to be passed into said space in heat exchange relation with said heating element.

It is also an object of this invention to provide a vessel heater having a cavity housing the heating element, and a source of compressed non-inflammable normally gaseous fluid coupled with said cavity, said fluid being provided in both its gaseous and liquid phases, and means for selectively admitting a limited quantity of the fluid in its gaseous phase into said cavity and/or a quantity of the fluid in its liquid phase into said cavity.

With the above objects, and other objects as may appear from the description of a specific embodiment as given hereinafter, reference will now be had to the drawing accompanying this application. The single figure on the drawing is a sectional view of the vessel heater of the instant invention and shows in dotted lines the position of a flask disposed for heating.

As shown on the drawing the apparatus consists of a casing 10 constructed of an outer hemispherical shell 11 and an inner member 12 providing a generally hemispherical vessel receiving pocket 13. The shell 11 and member 12 are spaced to provide a cavity 14 which is preferably filled with a pervious insulating material 15, such as, for example, glass wool. It is pointed out that the insulating material 15 must permit the flow of a gaseous medium therethrough to enable functioning of the apparatus in accordance with the instant invention.

The inner member 12 is preferably of a flexible fireproof fabric such as glass cloth and has an outwardly extending flange 16 around the peripheral edge of the pocket 13. A resistance wire heating element 17 is wound around the pocket 13 from a point commencing adjacent the upper edge of the pocket to a point adjacent the bottom of such pocket. Connecting wires 18 are secured to the opposite ends of the heating element 17 and extend outwardly through the insulation 15 and a grommet 19 carried in an aperture in the outer shell 11. The wires 18 may be connected through a suitable means (not shown) to a source of power for the energization of the heating element 17.

The outer shell 11 has a flange 20 extending around the periphery of the upper edge thereof. A pair of ring shaped plates 21 and 22 are secured by suitable threaded fasteners 23 to overlie one another so as to sandwich the flange 16 therebetween. An annular outer portion of plate 22 overlies the flange 20 and is secured thereto by a series of bolts 24 and nuts 25 cooperating with the overlying portions of plate 22 and flange 20 at peripherally spaced positions around the circumference of the device. Washers 26 are positioned between the overlying plate 22 and flange 20 to produce an opening 27 extending from the cavity 14 radially outwardly of the device between the washers. As will be apparent from the description given hereinbelow this opening permits egress of the cooling non-inflammable gaseous fluid which is fed into the cavity 14 in connection with the heating operation.

An aperture 30 is provided in the outer shell 11 adjacent the bottom thereof and a housing 31 is secured over such aperture as by suitable threaded fasteners 32. The housing 31 is provided with an internally threaded connector 33 communicating with the interior of such housing and thence through the aperture 30 with the cavity 14.

A conduit 34 is coupled between threaded connector 33 and a supply of non-inflammable and non-combustion-supporting fluid maintained in a compressed state in a container 35. The connections of conduit 34 with container 35 are made by way of a needle valve 36 and a valve 37. The non-inflammable fluid, which under atmospheric conditions is a gas, exists within container 35 under pressure in both its gaseous and liquid phases. Needle valve 36 couples conduit 34 with a pipe 38 terminating adjacent the upper end of container 35 to enable drawing off of the gaseous phase of the non-inflammable fluid. Valve 37 communicates with container 34 by way of a tube 39 which extends downwardly into container 35 to enable drawing off the liquid phase of the non-inflammable fluid. Thus a limited quantity of the non-inflammable fluid in its gaseous state may be admitted to the interior of the device under control of needle valve 36 to purge the device and preclude explosion or combustion adjacent the heating element. Further, when desired the heating device may be rapidly cooled by opening valve 37 to inject into the cavity 14 of the heating device a quantity of the non-inflammable fluid in its liquid phase.

Having described the structure of a preferred embodiment of the instant invention, reference will now be had to the mode of operation carried out by the use of such apparatus in the novel heating method of the instant invention. For purpose of illustration, reference will be made to the method and aparatus as specifically adapted for use in laboratory experiments. It is to be understood, however, that such method and equivalent apparatus may be adapted to a variety of other heating applications.

The heating element 17 is energized by connecting the wires 18 to a suitable source of electric power. To enable desired regulation of the heating rate, the connection to the power source may be made through a suitable thermostatic control or other manual regulator for varying the heating performed by element 17.

With a vessel V positioned in the pocket 13 of the device, energization of heating element 17 will affect heating of the contents of such vessel. During this heating operation it is desired that the danger of explosion or combustion by reason of contact of inflammable mixtures with the heating element be precluded. Additionally, it may be desired, particularly in connection with certain laboratory experiments, to be able to rapidly cool the heating device including heating element 17 together with the flask and its contents without damaging the heating device. This rapid cooling of the device will obviously retard the rate of heating.

To perform this action a supply of non-inflammable and non-combustion-supporting fluid such as, for example, $CO_2$ is fed into the cavity 14 through housing 31 and connector 33 by way of conduit 34. Such a non-inflammable normally gaseous fluid flows into the cavity 14 upwardly over and around the heating element 17 in the insulation 15 and eventually out through the opening 27 provided between flange 20 and plate 22. This gas blankets the heating element so that ignition or explosion of any combustible matter which may be adjacent the heating element is impossible. Desirably, the heating device is continuously purged with a slow stream of non-inflammable gas such a carbon dioxide. By slightly opening needle valve 36 a slow stream of gas will be admitted into cavity 14 of the heating device from the top of container 35 through pipe 38, valve 36, conduit 34, connector 33, housing 31 and aperture 30. This slow stream of gas will not materially reduce the heating effect of the element 17 during its normal operation but does make for safer normal operation of the device by preventing fire or explosion.

As noted hereinabove in connection with certain exothermic chemical reactions, it must be possible to rapidly cool the reaction to keep it from getting out of control. Normally the heating element 17 may be regulated through suitable control of the energization of such heating element to effect desired heating of the vessel contents. However, upon the occurrence of the need for rapid cooling of the whole assembly, the slow stream of non-inflammable fluid flowing through cavity 14 to continuously purge the device may be stepped up so that a large quantity of such fluid passes through the heating device.

Desirably to effect the rapid cooling of the heating device, valve 37 is opened to admit into cavity 14 the liquid phase of the non-inflammable fluid from the container 35 through tube 39, valve 37, conduit 34, connector 33, housing 31 and aperture 30. Thus the liquid phase of the non-inflammable fluid flows directly into the cavity 14 where it is quickly vaporized into its gaseous state, absorbing heat to effect rapid cooling of the heating device. Where carbon dioxide is the non-inflammable fluid the liquified carbon dioxide forms a fine mist of $CO_2$ snow within the heating device. This action insures rapid cooling of the heating device with the heat being carried away by the gaseous vapors expelled through opening 27. Further, when carbon dioxide is used as the cooling gas, it has been found that upon admission of a sufficient quantity of carbon dioxide from container 35, cooling may be effected so rapidly that frost will appear on the outside of the heating device. Obviously with this amount of carbon dioxide flowing into and through the device extremely rapid cooling is effected. At the same time the use of carbon dioxide to effect this rapid cooling is not detrimental or damaging to the structure of the heating device so that once the necessity for rapid cooling has passed the flow of carbon dioxide can be curtailed and the reaction temperature in the vessel quickly brought back by energization of the heating element 17. Normally the power for heating element 17 is interrupted prior to the introduction of the liquified normally gaseous fluid.

Having thus described my invention, what I claim is:

1. A vessel heater as recited in claim 2 wherein said means includes a first valve communicating with a supply of non-inflammable and non-combustion-supporting fluid in its gaseous phase to regulate admission of a quantity of fluid to blanket said heating element and thereby preclude ignition of combustible products adjacent said heating element, and a second valve communicating with a supply of non-inflammable and non-combustion-supporting fluid in its liquid phase to regulate admission of a quantity of fluid to effect rapid cooling of the vessel heater.

2. A vessel heater comprising an outer shell and an inner member joined to form a casing having an interior cavity, porous insulating material disposed in said cavity, a heating element mounted in juxtaposition with said inner member to heat the vessel, said casing having an inlet and an outlet, means for connecting said inlet to a supply of non-combustion-supporting and non-inflammable fluid to cool the heater for regulating the heating action and to blanket the heating element with a non-inflammable and non-combustion-supporting gas to preclude explosion or combustion of combustible products coming in contact with said heating element.

3. A vessel heater as recited in claim 2 wherein said outer shell and said inner member are generally hemispherical with said inner member providing a pocket to receive the lower portion of the vessel to be heated.

4. A vessel heater as recited in claim 3 wherein said inlet is disposed at the bottom of said outer shell and said inner member is made of flexible fireproof fabric.

5. A vessel heater comprising an outer shell, an inner hemispherical member having an outwardly extending flange around the peripheral edge thereof, said outer shell having an edge flange lying in the general plane of the flange on said inner member, means interconnecting the flanges on said outer shell and said inner member to provide a cavity between said shell and said member, said means including spacing elements disposed between said flanges to provide an opening extending outwardly from said cavity, a heating element in said cavity affixed to said inner member, and an inlet connection for said outer shell having means for connecting a supply of non-inflammable and non-combustion-supporting fluid in communication with said cavity whereby a supply of non-inflammable and non-combustion-supporting fluid may be introduced into said cavity to cool the heater in regulating its heating action and blanket the heating element with a non-inflammable and non-combustion-supporting gas to preclude ignition of combustible products coming in contact with said heating element.

6. A method for heating materials with a heating element housed in a cavity surrounding said element comprising the steps of energizing the heating element to raise the material being heated to the desired temperature, introducing a limited quantity of non-inflammable and non-combustion-supporting fluid into the cavity surrounding the heating element to blanket the heating element with a non-combustible atmosphere, and injecting a materially larger quantity of non-inflammable and non-combustion-supporting fluid into said cavity upon the occurrence of excessive temperatures in the material being heated to cool the heating element and thus rapidly reduce the rate of heating of the material being heated.

7. A method for heating materials as recited in claim 6 wherein said non-inflammable and non-combustion-supporting fluid is carbon dioxide.

8. A vessel heater comprising a casing having spaced walls providing a cavity therebetween, an electric heating element disposed in juxtaposition with one of said walls to heat the contents of a vessel positioned adjacent thereto, said casing having an inlet and an outlet, a supply of non-flammable and non-combustion-supporting fluid under pressure, and means connecting said inlet to said supply to admit said fluid into said casing to effect cooling of the heater as desired in regulating the heating action and preclude ignition of combustible products which may come in contact with said heating element.

9. A vessel heater as recited in claim 8 wherein said non-inflammable and non-combustion-supporting fluid is carbon dioxide.

References Cited in the file of this patent

UNITED STATES PATENTS

| 2,202,373 | Dahl | May 28, 1940 |
| 2,209,099 | Grueneklee | July 23, 1940 |